United States Patent
Chiou et al.

(10) Patent No.: US 7,829,626 B2
(45) Date of Patent: Nov. 9, 2010

(54) AQUEOUS COMPOSITIONS COMPRISING POLYMERIC DULLER PARTICLE

(75) Inventors: Shang-Jaw Chiou, Lower Gwynedd, PA (US); Bradley K. Hageman, Pottstown, PA (US); Joseph M. Hoefler, Bensalem, PA (US); Ari K. Kar, Warrington, PA (US); Edwin H. Nungesser, Horsham, PA (US); John D. Whiteman, Churchville, PA (US); Dianzhi Yang, Shanghai (CN)

(73) Assignee: Rohm and Haas Company, Phila., PA (US)

( * ) Notice: Subject to any disclaimer, the term of this patent is extended or adjusted under 35 U.S.C. 154(b) by 264 days.

(21) Appl. No.: 11/710,786

(22) Filed: Feb. 26, 2007

(65) Prior Publication Data

US 2007/0218291 A1 Sep. 20, 2007

Related U.S. Application Data

(60) Provisional application No. 60/782,468, filed on Mar. 15, 2006, provisional application No. 60/808,285, filed on May 25, 2006.

(51) Int. Cl.
*C08L 33/02* (2006.01)
*C08L 33/08* (2006.01)
*C08L 33/10* (2006.01)

(52) U.S. Cl. .............................. 524/522; 524/1; 524/2; 524/500; 525/50; 106/499

(58) Field of Classification Search ................. 524/523, 524/500, 501, 502, 522
See application file for complete search history.

(56) References Cited

U.S. PATENT DOCUMENTS

| | | | |
|---|---|---|---|
| 3,865,899 A | 2/1975 | deVries | |
| 4,972,000 A * | 11/1990 | Kawashima et al. | 521/54 |
| 4,978,695 A * | 12/1990 | Hoshino et al. | 523/201 |
| 5,237,004 A | 8/1993 | Wu et al. | |
| 5,373,060 A | 12/1994 | Guentherberg et al. | |
| 5,618,859 A | 4/1997 | Maeyama et al. | |
| 5,626,955 A | 5/1997 | Goetz et al. | |
| 5,719,247 A | 2/1998 | Delgado et al. | |
| 5,744,534 A | 4/1998 | Ishiharada et al. | |
| 5,760,122 A | 6/1998 | Susa et al. | |
| 5,922,457 A * | 7/1999 | Yanagisawa et al. | 428/342 |
| 5,932,342 A | 8/1999 | Zeira et al. | |
| 6,239,215 B1 | 5/2001 | Morita et al. | |
| 6,251,512 B1 * | 6/2001 | Gustafson et al. | 428/323 |
| 6,288,172 B1 | 9/2001 | Goetz et al. | |
| 6,471,885 B2 | 10/2002 | Chiang et al. | |
| 6,476,148 B1 | 11/2002 | Gross | |
| 6,743,834 B2 * | 6/2004 | Yokoyama et al. | 523/203 |
| 6,806,308 B2 * | 10/2004 | Zajac | 524/522 |
| 6,977,696 B2 * | 12/2005 | Amimori et al. | 349/112 |
| 2002/0012750 A1 * | 1/2002 | Chiang et al. | 427/385.5 |
| 2002/0037384 A1 | 3/2002 | Matsunaga et al. | |
| 2002/0042347 A1 | 4/2002 | Matsunaga et al. | |
| 2003/0036604 A1 | 2/2003 | Meisenburg et al. | |
| 2004/0005453 A1 | 1/2004 | Leyrer et al. | |
| 2004/0062913 A1 | 4/2004 | Suto et al. | |
| 2004/0109853 A1 | 6/2004 | McDaniel | |
| 2004/0234886 A1 | 11/2004 | Rudolph et al. | |
| 2005/0014674 A1 | 1/2005 | Liechty et al. | |
| 2006/0057291 A1 | 3/2006 | Duris et al. | |
| 2006/0216525 A1 | 9/2006 | Huybrechts et al. | |

FOREIGN PATENT DOCUMENTS

| | | |
|---|---|---|
| DE | 1974757 A1 | 3/1999 |
| DE | 10138606 A1 | 2/2002 |
| DE | 10139475 A1 | 2/2002 |
| DE | 10223047 A1 | 12/2003 |
| DE | 10224984 A | 12/2003 |
| EP | 0522 454 A1 | 1/1993 |
| EP | 1704928 A | 9/2006 |
| JP | 59-204670 | 11/1984 |
| JP | H3-6269 A | 1/1991 |
| JP | 10-251556 | 9/1998 |
| WO | WO01/59215 A | 8/2000 |
| WO | WO 01/46286 | 6/2001 |
| WO | WO03/066692 A | 8/2003 |
| WO | WO2004/013184 A2 | 2/2004 |

OTHER PUBLICATIONS

Machine Translation of JP 10-251556 A.*

* cited by examiner

*Primary Examiner*—David Wu
*Assistant Examiner*—Vu A Nguyen
(74) *Attorney, Agent, or Firm*—Andrew E C Merriam

(57) ABSTRACT

The present invention provides aqueous matte coating compositions comprising a binder component B) and a polymeric duller component A) composed of particles of one or more multi-stage copolymer or single stage crosslinked (co)polymer, e.g. crosslinked t-butyl (meth)acrylate, the duller component particles A) having an average diameter of 1-20 μm. Components A) and B) are compatible. Preferably, the duller component A) is acrylic; more preferably, components A) and B) are acrylic. The aqueous compositions provide matte coatings having haptic or feel (soft touch) properties, film and appearance properties, including burnish resistance and low color loss.

10 Claims, No Drawings under 100.
AQUEOUS COMPOSITIONS COMPRISING POLYMERIC DULLER PARTICLE

This is a non-provisional application of prior pending U.S. provisional Application Ser. No. 60/782,468 filed on Mar. 15, 2006 and U.S. provisional Application Ser. No. 60/808,285 filed on May 25, 2006.

The present invention relates to aqueous coating compositions comprising a polymeric duller component having an average particle diameter of 1-20 μm and a binder component, which provide matte coatings having clarity, burnishing resistance, flexibility and feel or haptic properties, and the coated articles made therefrom. More particularly, it relates to aqueous coating compositions comprising a binder component and a duller component compatible therewith, the duller particles chosen from multi-stage polymers and from single stage polymers having a $T_g$ of from $-60°$ C. to $75°$ C., and soft touch coatings made therefrom.

Control of gloss may be critical in the design and application of protective and/or decorative coatings for many finished goods, such as e.g. leather, wood, glass, masonry, plastics and metal. One way to lower gloss comprises adding matting agents, also known as dullers, which are either inorganic particles, such as, for example, silica, or calcium carbonate particles, or organic particles, such as, for example, polyurethane dispersions, or urea-formaldehyde resins that function by roughening the surface of the film. While effective at reducing gloss, however, these dullers result in a significant degree of light scattering, both forward and backscatter, and in internal and external reflection. Such uncontrolled interaction of light with the duller particles can cause graying, haziness, cloudiness, loss of color intensity and a washed-out appearance of the coated article. Furthermore, duller particles often disrupt film integrity and can lead to loss of key film properties such as water and abrasion resistance, flexibility etc. Still further, duller particles tend to polish or burnish after rubbing, leading to an increase in the gloss.

Others have unsuccessfully attempted to overcome the problems associated with the use of duller particles by any of control of particle size, minimizing random light scattering, careful selection of refractive index between particle and matrix, or modifying the matrix or film forming polymer. However, such approaches sacrifice clarity or film properties for matte effect and can greatly limit the scope of useful compositions.

In U.S. patent application 2004/0062913, to Dai Nippon Print Co., Ltd. an aqueous or solvent based thermosetting resin composition comprising organic or inorganic porous fine particle dullers provides a jet black coating or film for synthetic leather which resists color fading. However, most porous dullers tend to have a high binder demand and will absorb resin or film former and ultimately impair film quality and flexibility. Further, the use of many inorganic dullers in amounts of more than 30 wt. %, based on the weight of all dullers, provides chalky or hazy coatings. In addition, the Dai Nippon solution applies only to compositions for providing coated articles of jet black synthetic leather. Still further, a solvent based composition contains unacceptable amounts of volatile organic compounds (VOC's) and is undesirable from a health, environmental and safety standpoint.

Accordingly, it would be desirable to provide a versatile composition which enables the provision of durable matte finish coatings without the problem of color loss, increase in gloss or inadequate film properties.

In accordance with the present invention, the inventors have discovered that a composition containing unique polymer particles that provides coatings having tunable gloss control and burnish resistance, with no appreciable loss of clarity, color intensity or film properties.

STATEMENT OF THE INVENTION

The present invention provides aqueous compositions comprising a polymeric duller component A) composed of particles having an average diameter of 1-20 μm of one or more polymer chosen from a multi-stage copolymer, a single stage crosslinked (co)polymer having a $T_g$ of from $-60°$ C. to $75°$ C., and mixtures thereof, and binder component B) composed of one or more film forming organic binder compatible with the duller component A). The compositions form coatings or films that are non tacky. Suitable binder polymers may be chosen from one or more polymer binder having a mw of from 200,000 to 10,000,000 and one or more polymer binder having a Tg of from $20°$ C. to $70°$ C. and an mw of up to 1,000,000, or 10,000 or higher, and mixtures thereof. Suitable duller particles will form a coating film when combined with a film forming binder component at a weight ratio of duller particles to binder of GOTHRU4:1 applied to a substrate and dried at $150°$ C. or below.

Preferably, duller component A) comprises one or more multistage polymers having at least one additional outer stage graft polymerized onto first stage polymer particles. More preferably, each of the binder and the duller components of the present invention is acrylic. In an example of a preferred embodiment, the binder component B) comprises one or more two-stage acrylic emulsion polymer and duller component A) comprises one or more acrylic single stage (co)polymer.

Suitable duller particles may include, for example, polymers chosen from single staged polymers, such as crosslinked t-butyl acrylate (t-BA) (co)polymer, crosslinked 2-ethylhexyl (meth)acrylate (co)polymer, crosslinked sec-butyl (meth)acrylate (co)polymer, crosslinked ethyl (meth)acrylate (co) polymer, crosslinked methyl acrylate (co)polymer, crosslinked hexyl (meth)acrylate (co)polymer, crosslinked isobutyl (meth)acrylate (co)polymer, crosslinked benzyl (meth)acrylate (co)polymer, crosslinked isopropyl (meth) acrylate (co)polymer, crosslinked decyl (meth)acrylate (co) polymer, crosslinked dodecyl (meth)acrylate (co)polymer, crosslinked n-butyl (meth)acrylate (co)polymer, crosslinked $C_{21}$ to $C_{30}$ alkyl (meth)acrylates, crosslinked vinyl propionate (co)polymer, urethane polymer, melamine resin, silicone-functional (meth)acrylate copolymer, a copolymer of any of the crosslinked polymers with an acrylic monomer the copolymer having a $T_g$ of from $-10°$ C. to $75°$ C., a copolymer of any of the crosslinked polymers with a vinyl monomer the copolymer having a $T_g$ of from $-10°$ C. to $75°$ C.; multi-stage polymers, such as acrylic multi-stage polymer, vinyl multi-stage polymer, multi-stage synthetic rubber copolymer, multi-stage urethane copolymer, water-dispersible graft copolymer, mixtures and combinations thereof, such as poly (urethane acrylate). Preferably, duller particles comprise single stage crosslinked (co)polymers which are the polymerization product of more than 50 wt. % of monomers which would yield a homopolymer film having a $T_g$ of from $-10°$ C. to $75°$ C. More preferably, the duller particles comprise multi-stage polymers.

The aqueous compositions may be applied to a variety of substrates, and, preferably, to leather, dried and, optionally, cured to provide matte coated articles.

Aqueous compositions of the present invention comprise an organic binder component B) and a duller component A) comprised of polymer particles with average diameters of from 1 to 20 μm and, preferably having a narrow particle size distribution (PSD), wherein the two components A) and B) are compatible with one another. Suitable dullers may have a $T_g$ of from −60° C. to 75° C., preferably from −10° C. to 60° C. The composition of the present invention enables the provision of coatings having a dull or matte finish and excellent film clarity without cloudiness or haziness, good "hand feel" (i.e. soft touch) and film properties. Film properties achieved include flexibility, rub fastness, burnish resistance and print characteristics upon embossing. Preferably, the composition comprises no solvents, enabling good film formation in a low VOC use.

As used herein, the phrase "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, the phrase "aqueous" shall mean water or water mixed with 50 wt. % or less, based on the weight of the mixture, of water-miscible solvent.

As used herein, the phrase "average diameter" refers to the median particle size of a distribution of particles as determined by electrical impedance using a Multisizer 3 Coulter Counter (Beckman Coulter, Inc., Fullerton, Calif.), per manufacturer's recommended procedures. The median is defined as the size wherein 50 wt. % of the particles in the distribution are smaller than the median and 50 wt. % of the particles in the distribution are larger than the median.

As used herein, the phrase "60° Gloss" refers to the gloss of a coated article or coating, measured at a 60° viewing angle using a Micro-TRI Gloss™ meter (from BYK-Gardner GmbH, Geretsried, Del.).

As used herein, the phrase "compatible" shall mean that a component or polymer itself is capable of forming a homogeneous blend with another component or polymer.

As used herein, the phrase "copolymer" shall mean copolymers, terpolymers, tetrapolymers, pentapolymers or hexapolymers, and also to random, block and graft copolymers.

As used herein, the phrase "low $T_g$ monomer" shall mean any monomer, a homopolymer of which will have a $T_g$ of 20° C. or below.

As used herein, unless otherwise indicated, the phrase "molecular weight" or "mw" refers to the weight average molecular weight of a polymer as measured by gel permeation chromatography (GPC) against a polyacrylic acid standard.

As used herein, the phrase "narrow PSD" shall mean a particle size distribution wherein at least 90 wt. % of the particles fall within ±20% of the average particle diameter.

As used herein, the phrase "non-tacky" shall refer to compositions which, when applied and dried to form a film are not sticky to the touch.

As used herein, the phrase "nonionic monomer" shall mean that the copolymerized monomer residue does not bear an ionic charge at a pH of from 2 to 13.

As used herein, the phrase "polymer" shall include resins and copolymers.

As used herein, the phrase "resin" shall include polymers and copolymers.

As used herein, the phrase "synthetic rubber" shall refer to ethylene-propylene-diene (EPDM), styrene-butadiene copolymers, silicone rubber, urethane rubber, diene rubber, and thermoplastic polyolefin (TPO).

As used herein, the phrase "$T_g$" shall mean glass transition temperature measured by differential scanning calorimetry (DSC) taking the inflection point in the thermogram as the $T_g$ value. In the case of a multi-stage polymer, the reported $T_g$ value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

As used herein, the phrase "vinyl" or "vinyl monomer" shall mean acrylic, vinyl ester, vinyl ether, monovinyl aromatic compounds, such as styrene and α-methyl styrene, and vinyl halides.

As used herein, the phrase "wt. %" shall mean percent by weight.

All ranges recited are inclusive and combinable. For example, an average diameter of 1 μm or more, or 2 μm or more, or 4 μm or more and up to 20 μm, or up 15 μm, will include ranges of 1 μm or more to 20 μm or less, 1 μm or more to 15 μm or less, 2 μm or more to 15 μm or less, 2 μm or more to 20 μm or less, 4 μm or more to 15 μm or less, and 4 μm or more to 20 μm or less.

Unless otherwise indicated, all temperature and pressure units are standard temperature and pressure (STP).

All phrases comprising parenthesis denote either or both of the included parenthetical matter and its absence. For example, the phrase "(co)polymer" includes, in the alternative, polymer, copolymer and mixtures thereof.

Duller component A) comprises polymer particles having an average diameter of 1-20 μm. Suitable duller particles have an average diameter of 1 μm or more, preferably, 2 μm or more, or 4 μm or more, or 5 μm or more. When the average diameter of the particles is smaller than 1 μm, the particles tend to aggregate and become difficult to disperse adequately in the aqueous composition. Suitable duller particles may range up to 20 μm, or up to 15 μm, or, preferably, up to 10 μm or, more preferably, up to 8 μm. If many duller particles smaller than the desired size are present in the compositions, the matting efficiency of the duller decreases; if many duller particles larger than the desired size are present in the compositions, the coating surface is less attractive and clarity decreases.

Preferably, duller particles comprise multi-stage polymers with, for example, a core-shell or layered structure, such as a multilobal structure. Multi-stage duller particles comprise a polymeric core phase and one or more polymeric shell phase and can comprise a graded refractive index (grin) composition. The core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomer polymerizable by free-radical initiation.

In one embodiment, duller particles comprise multi-stage polymers having rubbery cores, i.e. having a $T_g$ of 20° C. or less, or 10° C. or less. Rubbery cores may comprise synthetic or natural rubbers, or, preferably, acrylic rubbers. Acrylic rubber cores comprise alkyl acrylate copolymers, the alkyl group having from 2 to 8 carbon atoms, copolymerized with from 0 to 10 wt. %, preferably up to about 5 wt. %, or up to 1 wt. %, or 0.05 wt. % or more, of one or more crosslinker, based on the total weight of core monomers, from 0 to 10 wt. %, preferably up to 5 wt. %, or up to 2.5 wt. %, and, preferably, 0.1 wt. % or more, or 0.5 wt. % or more, of one or more graftlinker, based on the total weight of core monomers, and from 0 to 50 wt. % of one or more copolymerizable vinyl monomer, based on the total weight of core monomers. Of the one or more polymer shells surrounding the acrylic rubber, the outermost shell is compatible with the binder component B). The shell(s) may comprise from 0 to 40 wt. % of the multistage particles.

In rubbery core polymers for duller particles A), the preferred alkyl acrylate is t-BA or BA. The copolymerizable vinyl monomer or monomers may be monovinyl monomers, such as alkyl methacrylates and monovinyl arenes, e.g. styrene. Monovinyl arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The refractive index of the core polymer and of binder component B) may, optionally, match exactly to produce an almost completely transparent composition. In one example, a preferred two-stage 5 μm average diameter copolymer comprises rubbery poly(BA) crosslinked with allyl methacrylate and has a hard shell of poly methyl methacrylate (pMMA), the shell comprising 20 wt. % of the particle.

Crosslinking monomers suitable for use in the core polymer are generally di- or poly- ethylenically unsaturated monomers copolymerizable with the other core monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth)crylates, diallyl phthalate, and the like. The preferred crosslinking monomers are butylene glycol diacrylates.

Graftlinking monomers suitable for use in the core polymer generally are di- or poly- ethylenically unsaturated monomers copolymerizable with the other core monomers and having sufficiently low reactivity of the unsaturated groups to allow significant residual unsaturation to remain in the core polymer subsequent to its polymerization, such as, for example allyl methacrylate (ALMA), allyl acrylate, diallyl maleate, allyl acryloxypropionate and the like. The preferred graftlinking monomer is ALMA.

Surrounding the core of a multi-stage polymer particleis one or more shell of polymer. The shell polymers may comprise from about 0.1 to about 40%, preferably, from about 5 to about 40%, and, more preferably, from about 15 to about 35%, based on the total particle weight.

The outer shell polymer of multi-stage duller particles in component A) is compatible with binder component B). For example, a shell of poly(methyl methacrylate) will be compatible with a matrix polymer of poly(methyl methacrylate), or poly(vinyl chloride). Likewise, single stage (co)polymer dullers A) are compatible with binder component B). For example, the shell of a multi-stage duller A) polymer or a crosslinked copolymer duller A) may be compatible with the polymer binder B) as a result of chemical similarity, as in the above example of methyl methacrylate polymers for the shell and the matrix polymer, or it may be determined empirically to be compatible, as in a copolymer of t-BA copolymerized with about 25 to about 30%, based on total monomer weight, of acrylonitrile or styrene; this copolymer duller is also compatible with any of a poly(methyl methacrylate), other (co)poly(meth)acrylate binder. Many such compatible polymer combinations for the duller and binder polymers are known to those skilled in the art, and others may readily be determined by routine experimentation, as for example by preparing blends of proposed duller and binder polymers and examining the blends for such evidence of compatibility as absence of haze, existence of a single glass transition temperature, and the like.

Duller particles may be made by any process which results in particles having an average particle diameter of 1-20 μm. Particles at the upper end of the desired size range may be made by suspension polymerization techniques but this requires post polymerization particle classification. Preferably, the duller particles are formed by emulsion polymerization.

In a preferred embodiment of the present invention, duller particles are prepared by aqueous emulsion polymerization of at least one monomer component of either the core or single stage (co)polymer to form submicron average diameter emulsion (co)polymer or oligomer seed particles, followed by swelling the seed particles with one or more monomer components of the core or single stage (co)polymer, e.g. via absorption, and polymerizing the one or more monomer within the emulsion seed particles to yield the particles of a desired average diameter and , preferably, having a narrow PSD. The swelling and polymerizing steps may be repeated until the particles have grown to the desired core or single stage (co)polymer size. Where seed particles are pre-made, particles of varying size and composition suitable for use as dullers can be produced by using appropriately sized swellable (co)polymer or oligomer seeds.

Seed particles may be made by conventional emulsion (co)polymerization. Suitable seed polymer precursors for making microparticle beads may include, for example, oligomeric emulsion polymer particles in the range 30-1000 nm. Uniformly sized particles larger than 5 μm in average diameter may be produced by starting with seed polymer particles larger than 1000 nm, or by polymerizing additional monomer in the presence of already made duller microparticles. For example, 1 to 10 μm average diameter seed particles may be swollen with one or more crosslinking monomer, such as divinylbenzene, and one or more monomer, such as an acrylic monomer like t-butyl acrylate (t-BA), to grow beads, such as poly(t-BA) beads.

One or more or all swelling and polymerization steps may be performed in the absence of conditions limiting the molecular weight of the resulting (co)polymer, such as, for example, in the absence of a chain-transfer agent. However, initially formed emulsion (co)polymer seed particles do not swell as readily as subsequent, larger particles having a lower overall molecular weight formed in under conditions limiting the molecular weight of the resulting (co)polymer. At least the final (co)polymerization or (co)polymerization stage is carried out under conditions which do not limit the polymer molecular weight.

More preferably, the core or single stage (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more or all of the swelling and polymerization steps can be performed using the conditions which restrict the polymer molecular weight and such steps can be alternated, followed by or subsequent to swelling and polymerization steps may be performed in the absence of conditions limiting the molecular weight of the resulting (co) polymer.

Alternatively, dry polymer particles can be processed to a desired size and then dispersed in water if they are water dispersible, i.e. comprise hydrophilic groups such as hydroxyl, carboxyl or amine groups, or, alternatively, emulsified to form an oil-in-water emulsion. For example, dry particles having a Tg above room temperature or 25° C. may be ground, such as by jet milling, and, if needed, run through a particle classifier to create the desired average diameter and, if desired, a narrow PSD. Dry rubbery or thermoplastic particles may be cryoground and run through a classifier to create the desired average diameter.

Other alternative techniques to manufacture emulsion (co) polymers or (co)polymer cores are disclosed in the literature, such as, for example, Japanese Kokai 62-84156 which describes a growout process involving polymerization of mixtures of monofunctional and polyfunctional monomers, followed by a staging with a high concentration of polyfunctional monomers, with oil-soluble initiators onto a preformed seed to form fine granules with a standard deviation of below 1 μm, preferably below 0.5 μm.

Crosslinking of any (co)polymer and any graftlinking of a core (co)polymer to a shell polymer results from inclusion of one or more copolymerizable crosslinking and/or graftlinking monomers in the polymerizable monomer mixtures. Alternatively, the core polymer or single stage (co)polymer may be crosslinked and the core polymer may be graftlinked to the shell polymer using other known techniques, for example, post-cure reactions, such as by forming a copolymer from a monomer having a pendant peroxide group and then activating the peroxide by heating to a temperature higher than that used in the polymerization. The activated peroxide group will promote graftlinking and crosslinking of the core/shell polymer components. In another example, crosslinking or graftlinking may be achieved post-cure by adding to the polymerization a second free-radical initiator that is stable at the initial polymerization temperature and is activated by light or at a higher temperature, followed by activating the initiator.

Multi-stage dullers or binders can comprise multilobal copolymers. In the case of binders, the outer layer or lobes should be film forming. Multilobals are formed from different and relatively incompatible core and lobe (co)polymer compositions, varying to the extent that the interaction parameter, $X_{C-L}$, is greater than about 0.05. The interaction parameter can be calculated for the lobe and core polymers by the method of Krause et al., J. Chem. Physics, 43, 2144 (1965). Appropriate values of the Hildebrand solubility values necessary for the calculation may be found in Van Krevelen, "Properties of Polymers," Elsevier Publishers (New York), 1976. Multilobals may be formed by adding an initial increment of a redox couple or of a reducing agent alone and starting gradual addition feed of the appropriate lobe-forming monomer and gradual addition of the redox couple simultaneously with the monomer feed as polymerization proceeds at the same or a higher rate of addition to completion, wherein an increased the level of one or more surfactant is added with lobe-forming monomer to just below the level at which new particles are initiated. The average diameter of the multilobal particles may be determined by the diameter a sphere of equivalent volume would have.

Aqueous binder component B) may comprise any one or more (co)polymer compatible with duller component A) that can form a film under conditions of use. Suitable binder polymers may be chosen from, for leather and paper applications, one or more polymer binder having a mw of from 200,000 to 10,000,000, and, for architectural, industrial and cosmetic applications, one or more polymer binder having a Tg of from 20° C. to 70° C. and an mw of up to 1,000,000 and more than 10,000, for example, more than 30,000.

Suitable binders may comprise aqueous emulsion (co) polymers or aqueous emulsions, i.e. oil-in-water, of preformed (co)polymers chosen from acrylic, vinyl, such as vinyl acetate or vinyl acetate-ethylene, polyurethanes, siloxanes, natural rubbers, synthetic rubber polymers, such as styrene-butadiene (SBR) block copolymers, and mixtures and combinations thereof, for example, acrylic urethanes. The binders preferably are acrylic, and, more preferably, comprise two-stage acrylic copolymers. Two-stage acrylic polymers may comprise interpenetrated networks (IPN), core-shell polymers having a film forming shell, graft copolymers of one water dispersible acrylic polymer with one another vinyl or acrylic (co)polymer, or multilobals. An example of such a preferred acrylic copolymer is a 97 wt. % ethyl acrylate (EA), 3 wt. % acrylic acid (AA) copolymer first stage and a pMMA second stage wherein the shell is 40 wt. % or less of the copolymer; this multistage polymer is denoted as (60-100)EA(97)/AA(3)//(0-40)MMA.

Acrylic emulsion (co)polymers may comprise the polymerization reaction product of (i) from 30 to 99.9 wt. %, or 60 wt % or more or 70 wt. % or more or up to 95 wt. % of one or more acrylic monomer; (ii) from 0 to 60 wt. %, or up to 30 wt. % of one or more copolymerizable ethylenically unsaturated monomer; (iii) from 0 to 10 wt. %, preferably, 0.1 wt. % or more, or, more preferably, 0.5 wt. % or more, or up to 5 wt. % of one or more monoethylenically unsaturated carboxylic acid or anhydride monomer, or salt thereof, (iv) from 0 to 10 wt. %, preferably, up to 5 wt. % of one or more polar copolymerizable monoethylenically unsaturated monomer; (v) from 0 to 20 wt. %, preferably, from 0 to 10 wt. % of one or more functional copolymerizable monoethylenically unsaturated monomers; and (vi) from 0 to 10 wt. %, preferably from 0 to 5 wt. %, all proportions based on the weight of all monomers used to make the (co)polymer, of one or more crosslinking or graftlinking monomer.

Suitable acrylic monomers may include, for example, one or more $C_{1-30}$ alkyl (meth)acrylate monomer, $C_{5-30}$ cycloalkyl (meth)acrylate, or $C_{5-30}$ (alkyl)aryl (meth)acrylate monomer, including, for example, methyl methacrylate, isodecyl methacrylate and low $T_g$ acrylic monomers. Suitable low Tg monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA). Preferred binders may comprise (co)polymers which are the polymerization product of monomers chosen from EA, BA, and 2-EHA.

Suitable copolymerizable ethylenically unsaturated monomers may include, for example, silicon or fluorine containing (meth)acrylates, conjugated dienes, such as butadiene; vinyl acetate or other vinyl esters; vinyl monomers, such as styrene or substituted styrenes, including a-methyl styrene, vinyl chloride, and vinylidene chloride.

Suitable copolymerizable monoethylenically-unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, styrylic acid, and the anhydrides and salts thereof. Preferred carboxylic acid monomers are acrylic acid, (meth)acrylic acid, and itaconic acid. Such monomers confer water dispersibility to acrylic and vinyl emulsion polymer binders.

Emulsion polymer binders may, alternatively, be made water dispersible by chemical modifications known in the art. For example, vinyl acetate polymers may be partially hydrolyzed, and polyolefins may be acid functionalized, e.g. via maleation.

Suitable polar copolymerizable monoethylenically unsaturated monomers may include, for example, phosphoethyl (meth)acrylate, 2-(meth)acrylamido-2-methylpropane sulfonic acid (AMPS™, Lubrizol Corp., Wickliffe, Ohio), hydroxyethyl (meth)acrylate, hydroxypropyl (meth)acrylate, aminoalkyl (meth) acrylates, N-vinyl pyrollidinone, (meth) acrylamides, N-vinylimidazoles and cationic monomers such as (meth)acrylamidopropyl trimethylammonium chloride [(M)APTAC], and diallyldimethylammonium chloride (DADMAC).

Suitable functional copolymerizable monoethylenically unsaturated monomers may include, for example, monoethylenically unsaturated monomers containing an acetoacetate or acetoacetamide group, such as, for example, vinyl acetoacetate, acetoacetoxyethyl (meth)acrylate, acetoacetoxypropyl (meth)acrylate, allyl acetoacetate, acetoacetoxybutyl (meth) acrylate, 2,3-di(acetocacetoxy)propyl (meth)acrylate, vinyl acetoacetamide, and acetoacetoxyethyl (meth)acrylamideacetoacetoxyalkyl (meth)acrylates; diacetoneacrylamide, and monoethylenically unsaturated monomers containing nitrile group (meth)acrylonitrile, and are, preferably, acetoacetoxyethyl methacrylates (AAEM). Such monomers help to make acrylic and vinyl emulsion polymer binders more resistant to chemicals.

Suitable crosslinking and graftlinking multi-ethylenically unsaturated monomers may include the same monomers as are used to make polymeric duller particles.

The binder polymers take the form of particles having an average diameter of 30-1000 nm, or 50 nm or more, 100 nm or more, or 300 nm or more. For leather applications, the polymers in the emulsions take the form of particles having an average diameter of 30 to 500 nm, preferably 50 or more nm, or, preferably, up to 300 nm.

For leather and paper applications, the $T_g$ of the emulsion polymer binder or the average of the $T_g$S of binder polymer mixtures may range from −100° C. to room temperature, or, preferably up to 20° C., more preferably 10° C. or less, and, even more preferably, 0° C. or less. Suitable acrylic emulsion (co)polymers for leather and paper applications may comprise the copolymerization reaction product of from 60 to 99.5 wt. % of low $T_g$ monomers with 0.1 wt. % or more of (iii) one or more ethylenically unsaturated carboxylic acid or anhydride monomer, or salts thereof, and the remainder of one or more (i) acrylic and/or (ii) copolymerizable ethylenically unsaturated monomer other than a low $T_g$ monomer, and/or one or more of any (iv) polar, (v) functional, or (vi) crosslinking or graftlinking monomer, all monomer proportions based on the weight of all monomers used to make the (co)polymer. The mw of polymers useful as binders B) for leather or paper is up to 10 million, more than 200,000, or more than 1 million.

For architectural or industrial coatings applications or cosmetics, polymers useful as binders B) can comprise one or more aqueous emulsion polymers having weight average molecular weight of up to 1 million, or 10,000 or more, 30,000 or more, for example, 50,000 or more, or up to 500,000. Such binder polymers have $T_g$S of less than 70° C., or more than 20° C., and are preferably acrylic. Suitable acrylic emulsion (co)polymers for architectural coating applications may comprise the copolymerization reaction product of from 30 to 69.75 wt. %, of low $T_g$ monomers, copolymerized with 69.75 to 30 wt. % of (i) one or more acrylic and/or (ii) copolymerizable ethylenically unsaturated monomer other than a low $T_g$ monomer, 0.5 to 10 wt. % of (iii) one or more ethylenically unsaturated carboxylic acid or anhydride monomer, or salt thereof, and the remainder comprising one or more, and/or one or more of any (iv) polar, (v) functional, or (vi) crosslinking or graftlinking monomer, all monomer proportions based on the weight of all monomers used to make the (co)polymer.

In another embodiment, acrylic emulsion polymer binders providing leather coatings with good embossability and wet-flex resistance may comprise from 0.4% to 10% by weight of copolymerized acetoacetate or acetoacetamide monomer. For example, a two-stage binder containing 80 wt. % or more, based on the weight of the polymer, of a first polymer containing from 0.1% to 10 wt. % of copolymerized acetoacetate or acetoacetamide monomer and having a $T_g$ from −30° C. to 0° C., and from 2 to 20 wt. %, based on the weight of the polymer, of a second polymer containing from 0 to 10 wt. % of copolymerized acetoacetate or acetoacetamide monomer and having a $T_g$ at least 10° C. higher than the $T_g$ of the first polymer.

In yet another embodiment, aqueous emulsion polymer binders for providing leather coatings comprise multi-stage polymers containing 0.1 wt. % or less, based on the weight of the binder, of copolymerized multi-ethylenically unsaturated monomers, wherein the second stage polymer has a $T_g$ of greater than 20° C. and at least 10° C. higher than the $T_g$ of the first stage polymer. In such binders, the first stage has a $T_g$ of less than 20° C. and comprises greater than 50 wt. % of acrylic polymerized units, from 0.5 to 10 wt. % of a copolymerized monoethylenically unsaturated carboxylic acid monomer and, at least one copolymerized monoethylenically unsaturated monomer, based on the weight of first stage polymer. Further, in such binders, the first stage polymer has been contacted with a transition metal oxide, hydroxide, or carbonate at a pH of less than 9 in an amount greater then 0.1 equivalent of transition metal per equivalent of the copolymerized carboxylic acid monomer in the first stage. Still further, the second stage polymer comprises at least one copolymerized monoethylenically unsaturated monomer and from 0 to 10 wt. % of a copolymerized monoethylenically unsaturated carboxylic acid monomer, based on the weight of second stage polymer, wherein the second stage copolymerized carboxylic acid monomer is less than 25 wt. % of the total copolymerized carboxylic acid monomer in the multi-stage emulsion polymer. Yet still further, the second stage polymer comprises from 1% to 34 wt. % of the multi-stage polymer, based on dry polymer weight. Preferably, to improve softness, the first stage of the polymer useful as binder B) has a $T_g$ of less than 10° C., both the first and second stages include at least one copolymerized monoethylenically unsaturated non-ionic monomer, and the second stage polymer is formed in the presence of up to 15 wt. %, based on the weight of the second stage polymer, of one or more chain transfer agent.

For either or both of dullers and binders, polymerization techniques used to prepare aqueous emulsion-polymers and multi-stage emulsion polymers are well known in the art. The polymerization techniques used to prepare aqueous multi-stage emulsion-polymers are known in the art such as, for example, U.S. Pat. Nos. 4,325,856, 4,654,397, and 4,814,373. In multi-stage polymerization processes, at least two stages differing in composition are formed in a sequential fashion and in any order.

In emulsion polymerization, monomer mixture(s) may be added neat or as an emulsion in water. One or more monomer mixture may be added in one or more additions and may be added continuously over all or part the reaction period or not continuously over all or part of the reaction period. One or more monomer mixture can be added linearly, such as in the case of gradual addition (grad add), or not, such as, for example, in semi-continuous polymerization or addition all at once as a "shot", or in any combination thereof. To make higher mw polymers, one or more monomer mixtures should be added as a "shot" to the reactor or initially charged in the reactor at the beginning of one or more reaction stage.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. The amount of surfactant used is usually 0.1% to 6% by weight, based on the weight of monomer. The same surfactants and amounts thereof are used in both single stage and in multi-stage emulsion polymerization processes.

Either thermal or redox initiation processes may be used in either single stage or multi-stage emulsion polymerization processes. Known free radical initiators may be used at a level of from 0.01 to 3.0 wt. %, based on the weight of total monomer, such as, for example, peroxides, ammonium and/or alkali persulfates, perboric acid and its salts, perphosphoric acid and its salts, and ammonium or alkali metal salts of peroxydisulfuric acid, preferably persulfates. Redox systems using the same initiators may be used coupled with a suitable reductant such as, for example, (iso)ascorbic acid, alkali metal and ammonium salts of sulfur-containing acids, such as sodium sulfite, bisulfite, hydrosulfite, hydrosulfide or dithionite, formadinesulfinic acid, hydroxymethanesulfonic acid, sodium sulfoxylate formaldehyde, 2-hydroxy-2-sulfinatoacetic acid, 2-hydroxy-2-sulfonatoacetic acid, amines such as ethanolamine, glycolic acid, glyoxylic acid hydrate, mercaptans, such as mercaptopropionic acid or methyl-3-mercaptopropionate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used at from 0.001 to 3.0 wt. %, based on the weight of total monomer.

Chain transfer agents, may be used to lower the molecular weight of the formed polymer of one or more of the polymer stages. Chain transfer agent(s) may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexylmercaptan, n-dodecyl mercaptan, and mixtures thereof. Suitable amounts of chain transfer agents may range up to 20 wt. %, preferably, from 0.1 to 5 wt. %, based on the weight of all monomers used to make the (co)polymer.

In any emulsion polymerization, the reaction temperature should be maintained at a temperature lower than 100° C. throughout the course of the reaction, for example, at 30° C. or more, or 95° C., or 60° C. or more, or up to 90° C.

If desired, a suitable neutralizer may be added to partially or completely neutralize the acid or anhydride groups on polymers used as binder component B). Suitable neutralizers include but are not limited to sodium or potassium hydroxide, sodium carbonate, sodium bicarbonate, sodium acetate, magnesium hydroxide, calcium hydroxide, zinc salts such as zinc oxide, ammonia, triethylamine, dimethylethanolamine, aminomethylpropanol, diethylamine, triethanolamine, etc. For example, emulsions for use as binder B) may be contacted with a transition metal oxide, hydroxide, or carbonate at pH less than pH=9, preferably at pH =3-6, in an amount greater than 0.20 equivalent, preferably greater than 0.50 equivalent, of transition metal per equivalent of copolymerized carboxylic acid monomer in the emulsion polymer according to the process disclosed in U.S. Pat. No. 5,221,284.

To form aqueous compositions, one or more aqueous duller A) and aqueous binder B) may simply be mixed. In use such compositions comprise from 40 to 90 wt. % of water, preferably from 60 to 90 wt. %, based on the total weight of the composition, for use in leather or paper applications, and, preferably, from 40 to 80 wt %, based on the total weight of the composition, for use in architectural and industrial applications. Conversely, the total solids of the aqueous compositions may range from 10 to 60 wt. %, based on the total weight of the compositions, from 10 to 40 wt. % in leather applications and from 20 to 60 wt. % in other applications Suitable amounts of duller component A) may range from 2 to 45 wt. %, as solids based on the total weight of the aqueous composition, desirably from 1 to 20 wt. % in leather and paper applications, preferably 2 to 16 wt. %, and, in other applications, desirably from 2-30 wt. %. In leather, paper and cosmetic applications, the desired weight ratio, as solids, of the duller component A) to binder component B) may range from 0.1:1 to 10:1, preferably from 0.25:1 to 4:1.

Suitable amounts of binder component B) solids may range from 2 to 50 wt. %, based on the total weight of the aqueous composition, desirably from 2 to 25 wt. % in leather and paper applications, preferably 4 wt. % or more, or, more preferably 7 wt. % or more, and, in other applications, desirably from 10-50 wt. %, preferably 15 wt. % or more, or 20 wt. % or more. Aqueous compositions of the present invention may take the form of waterborne dispersions, e.g. alkaline, anionic or non-ionic, and may further comprise additives, such as, for example, feel additives, additional dullers, flow or wetting agents, thickeners or rheology modifiers or their mixtures, curing agents, pigments or colorants, opacifiers and extenders, antioxidants and plasticizers.

Feel additives, such as, for example, (organo)siloxanes and their copolymers, including oils; and waxes, are designed to migrate toward surfaces to improve the hand of products such as leather. Feel additives may take the form of aqueous dispersions having solids contents of up to 60 wt. %. Suitable amounts of feel additive solids may range up to 10 wt. %, preferably, up to 8 wt. %, based on the total weight of the aqueous composition. Excess amounts of feel additives cause unduly slippery or waxy finishes and products. An example of a suitable feel additive is Additive 2229W, a poly alkyl siloxane available from Rohm and Haas Company, Philadelphia, Pa.

Additional dullers may further reduce gloss via light scattering and surface roughening and may comprise known inorganic dullers, such as, for example, silica, fume silica, alumina, silicates, (sub)carbonates, e.g. calcium carbonate, kaolin, phyllosilicates, talc, titania, zinc oxides, zirconium oxides, and alkali(ne) hydroxides having average diameters from submicron up to 30 µm; or may comprise organic dullers, such as, for example, 2-30 µm average diameter polytetrafluoroethylene, polyethylene, silicone, polyurethane, urea-formaldehyde or polyvinylidene fluoride beads. The organic dullers may also fortify film strength. Useful proportions may include up to 30 wt. %, on a solids basis, of the total amount of duller component A) plus additional dullers.

Flow agent or wetting agents may comprise any surface active compound that improves flow or wetting of surfaces, such as, for example, fluorine or silicone containing surfactants, and anionic or nonionic surfactants. Suitable amounts of flow agent or wetting agent solids may range up to 15 wt. %, preferably, up to 10 wt. %, based on the total weight of the aqueous composition.

Thickeners or rheology modifiers may include any additive used to thicken or to modify rheology, such as, for example, alkali soluble emulsions (ASE), hydrophobically-modified alkali soluble emulsions (HASE), hydrophobically-modified ethyleneoxide-urethane polymers (HEUR), hydrophobically-modified cellulosics, hydrophobically-modified polyacrylamides, inorganic clay materials (such as bentonite), and hydroxyethyl cellulose (HEC). Suitable amounts of thickeners or rheology modifier solids may range up to 20 wt. %, preferably, up to 10 wt. %, based on the total weight of the aqueous composition.

Pigments or colorants, including iron oxides, opacifier pigments, such as, for example, titanium dioxide, and opacifying polymers, may be added in amounts of 0-120 parts per hundred weight parts solids (phr) of binder component B), especially when used as basecoats or colorcoats. In leather applications, pigments and dyes may be added so as to color the aqueous compositions to make a transparent or translucent film.

In addition, plasticizers, such as dioctyladipate or dioctylphthalate, may be added in the amount of up to up to 20 wt. %, preferably, up to 2 wt. %, based on the total weight of the aqueous composition. Further, any of antifoaming agents, antioxidants, or UV light absorbing agents may be added in the amount of up to up to 5 wt. %, preferably, up to 1.0 wt. %, based on the total weight of the aqueous composition.

One or more curing agent, such as, for example, a polyisocyanate, polyaziridine, or aminoplast resin may be added to the aqueous compositions for use at remote sites. Such curing agents may be used in amounts of 0.5 wt. % or more, and up to 15 wt. %, for example, from 1 to 10 wt. %, based on the total weight of the aqueous composition.

In addition, water for dilution may be added, such as, for example, for use at remote site to reduce the total solids of the compositions to a desired range. Accordingly, aqueous compositions may be shipped in any stable concentrated form, such as, for example, aqueous compositions comprising surfactants, flow agents or wetting agents and having solids contents, e.g., as high as 80-90 wt. %, based on the total weight of the aqueous composition.

In an embodiment of the present invention, the methods of using the aqueous compositions comprise forming the aqueous composition, applying the coating composition to one or more substrate and drying, optionally, curing, the coating composition. Drying may be performed in a known manner such as, for example, air drying or heat drying at temperatures that will not damage the substrate, e.g. 150° C. or below, or 100° C. or below. The aqueous compositions may be applied to unfinished or basecoat finished leather, or to paper by curtain coater and spraying methods such as, for example, air-atomized spray, air-assisted spray, airless spray, high volume low pressure spray, and air-assisted airless spray, by roll coating or knife coating. The aqueous compositions may be applied to architectural substrates or industrial substrates, e.g. metals, wood or plastics by any known method, such as, for example, spray, brush, roll, electrostatic bell or fluid bed.

Coatings made from the aqueous compositions of the present invention may include basecoats, color coats and topcoats comprising any of clearcoats, stains or translucent coatings, pigmented color coats and paints. The coatings may have a 60° Gloss of 80 or less, or 60 or less for any substrate, or 10 or less for leather, preferably, 2 or less.

The aqueous coating compositions may be applied to various substrates, including but not limited to leather such as, for example, mineral tanned or vegetable tanned leather, including full-grain leather, buffed or corrected-grain leather, or split leather, with or without a prior treatment with an impregnating resin mixture; plastics, such as cell phones, regular phones, computer housings, remote controls; wood, natural wood, plywood, engineered wood, such as medium density fiberboard (MDF), particle board, or other lignocellulosics; gypsum board; paper, cardboard, masonite, and paperboard; woven and non-woven textiles, such as polyester roofing mats, and cotton or synthetic fiber substrates; metals, such as, for example, metallic coils; and porous surfaces, such as concrete, brick, stone, and pavement or road surfaces. In addition, the compositions may be used to make cosmetics and body treating compositions, including but not limited to skin and hair care products, moisturizing creams, sunscreen, and makeup.

In the following examples, the abbreviations have the meanings given, as follows:

EA=ethyl acrylate; BA=butyl acrylate; AN=acrylonitrile; AA=acrylic acid; EHA=2-ethylhexyl acrylate; AAEM=2-acetoacetylethyl methacrylate; ALMA=allyl methacrylate; DVB=divinyl benzene; MMA=methyl methacrylate; BMA=butyl methacrylate; t-BA=tert-butyl acrylate; STY=styrene.

Standard Test Methods

Gloss Determination: Surface gloss is determined after spraying topcoat onto a smooth basecoat surface and after drying overnight. For this determination we measured the surface gloss at 60 and 85 degree geometry using a Micro-TRI Gloss™ meter.

Burnishing Resistance: A 3.5 cm×11 cm swatch of finished leather was removed and placed on a Rub Fastness Tester (model 421, Satra Footware Technology Centre). The leather is stretched 10% and the surface is rubbed using a dry felt pad and 1.0 kg of weight for 500 cycles. The surface gloss is measured before and after rubbing to determine the change in gloss. Burnishing resistant films provided better gloss consistency before and after rubbing.

Wet Rub Resistance: A 3.5 cm×11 cm swatch of finished leather was removed and placed on a Rub Fastness Tester (model 421, Satra Footware Technology Centre). The leather is stretch 10% and the surface is rubbed using a water soaked felt pad and 1.0 kg of weight for 300 cycles. After the felt pad dries, the amount of pigment transferred to the felt pad is subjectively, visually evaluated using a Gray scale. The Gray scale rating of 1-5 indicates a range of substantial pigment transfer to very minimal pigment transfer.

Flexibility Determination: A 3.8 cm×6.5 cm swatch of finished leather was removed and positioned on a bally flexometer (model 2397, Otto Specht Company). The leather was flexed for 100,000 cycles at ambient temperature. After flexing, the leather was visually evaluated for cracking and generation of "white crazing" in the flexing area. For the evaluation the sample was examined under a 10× sterio-scope.

Color determination: Color of the finished leather was determined using a color spectrophotometer (X-Rite 8400 Sphere spectrophotometer, X-Rite Incorporated). We determined the CIE L*a*b* values using a D65 light source at a 10 degree standard observer (gloss excluded).

PREPARATION EXAMPLES A-B

Synthesis of Emulsion Polymer Seed

Preparation Example A1

This example illustrates preparation of an emulsion polymer for use in preparing the core/shell particles which are the preferred dullers of the present invention. Unless otherwise noted, the terms "charged" or "added" indicate addition of all the mixture at once. The following mixtures were prepared:

| Mixture | Component | Parts By Weight |
|---|---|---|
| A | Water | 208 |
|   | Sodium Carbonate | 0.38 |
| B | BA | 98 |
|   | Butylene Glycol Diacrylate | 0.25 |
|   | ALMA | 2.0 |
|   | 10% aqueous Sodium Dodecylbenzenesulfonate | 4.0 |
|   | Water | 40 |
| C | Potassium Persulfate | 0.063 |
|   | Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the reaction mixture was stirred for 1 hour, after which the remaining Mixture B and Mixture C were metered in to the reactor, with stirring, over a period of 90 minutes. Stirring was continued at 82° C. for 2 hours, after which the reactor contents were cooled to room temperature. The average diameter of the resulting emulsion particles was 0.2 μm, as measured by light scattering using a BI-90 Plus instrument from Brookhaven Instruments Company, 750 Blue Point Road, Holtsville, N.Y. 11742.

Preparation Example A2

In this example the particles in the emulsion of Preparation Example A1 are grown to an average diameter 0.5 μm using an emulsion of BA and STY. The following mixtures were prepared:

| Mixture | Component | Parts by Weight |
|---|---|---|
| A | Water | 185 |
|   | Sodium Carbonate | 0.081 |
|   | Polymer Emulsion from Preparation Example A1 | 35 |
| B | BA | 82 |
|   | STY | 18 |
|   | 10% aqueous Sodium Dodecylbenzenesulfonate | 2.5 |
|   | Water | 32 |
| C | 1-Hexanethiol | 19 |
|   | 10% aqueous Sodium Dodecylbenzenesulfonate | 2.8 |
|   | Water | 11 |
| D | Potassium Persulfate | 0.11 |
|   | Water | 18 |
| E | t-Butyl Hydroperoxide | 0.18 |
|   | Water | 3.7 |
| F | 3% aqueous Sodium Formaldehyde Sulfoxylate | 4.1 |

Mixture A was added to the reactor of Example A1 and heated to 88° C. with stirring. Mixtures B, C and D were metered in to the reactor over a period of 3 hours, after which the temperature was maintained at 88° C., with stirring, for 90 minutes. The reactor contents were cooled to 65° C., Mixtures E and F were added, and the reactor contents were maintained at 65° C., with stirring, for 1 hour, after which the reactor contents were cooled to room temperature. The resulting emulsion polymer particles had an average diameter of 0.5 μm as measured by light scattering using a BI-90 Plus instrument.

Preparation Example B

This example illustrates preparation of 0.3 μm average diameter particles of BA-STY copolymer by emulsion polymerization. The following aqueous mixtures were prepared:

| Mixture | Component | Parts by Weight |
|---|---|---|
| A | Water | 162 |
|   | Potassium Carbonate | 0.12 |
| B | BA | 66 |
|   | STY | 15 |
|   | n-octyl mercaptan | 19 |
|   | 10% aqueous sodium dodecylbenzenesulfonate | 5.3 |
|   | Water | 19 |
| C | Potassium Persulfate | 0.014 |
|   | Water | 1.4 |
| D | Potassium Persulfate | 0.055 |
|   | Water | 8.3 |

A reactor equipped with a stirrer and condenser and blanketed with nitrogen was charged with Mixture A and heated to 87° C. To the stirred reactor contents were added 7% of Mixture B and all of Mixture C; the reactor contents were stirred for 30 minutes, after which the remaining Mixture B and Mixture D were metered in to the reactor, with stirring, over a period of 90 minutes. The reactor contents were maintained at 87° C. with stirring for 50 minutes, after which the resulting emulsion was cooled to room temperature. The butyl acrylate-styrene particles were 0.3 μm in average diameter, as measured by light scattering using a BI-90 Plus instrument.

PREPARATION EXAMPLES C-D

Binder Synthesis

Preparation Example C

Two Stage, Toughened Elastomeric Binder

The following mixtures were prepared:

| Mixture | Component | Parts by Weight |
|---|---|---|
| A | Water | 234 |
|   | 28% aqueous sodium lauryl sulfate | 30 |
|   | 23% aqueous sodium dodecylbenzenesulfonate | 30 |
|   | BA | 723.7 |
|   | AA | 26.3 |
| B | 0.15% ferrous sulfate heptahydrate | 4.0 |
| C | Water | 35 |
|   | Ammonium persulfate | 0.8 |
| D | Water | 25 |
|   | Sodium hydrosulfite | 1.4 |
|   | Ammonium hydroxide | 0.4 |
| E | Water | 10 |
|   | t-Butyl hydroperoxide | 0.45 |
| F | Water | 10 |
|   | Sodium formaldehyde sulfoxylate | 0.35 |
| G | Methyl methacrylate | 250 |
| H | Water | 9 |
|   | t-Butyl hydroperoxide | 0.9 |

-continued

| Mixture | Component | Parts by Weight |
|---|---|---|
| I | Water | 38 |
|   | Sodium formaldehyde sulfoxylate | 0.7 |
| J | Water | 35 |
|   | t-Butyl hydroperoxide | 1.5 |
| K | Water | 35 |
|   | Sodium formaldehyde sulfoxylate | 1.5 |
| L | Neutralizer | see Examples 5-12 |

A reactor equipped with a stirrer and condenser was charged with 1035 g of deionized water. Nitrogen was allowed to bubble through the water for 30 minutes. The reactor was then blanketed with nitrogen and charged with Mixture A. With the reactor mixture temperature below 20° C., Mixtures B, C and D were rapidly and successively added to the reactor. Within 10 minutes, the temperature rose as the polymerization started and peaked around 70° C. Ten minutes after the peak temperature, mixture E followed by mixture F are added. The material in the reactor is allowed to cool to 60° C. and Mixture G is added followed by Mixtures H and I. After 5 minutes, mixtures J and K are separately metered into the reactor over 30 minutes while the batch is cooled. The neutralizer is then added to partially neutralize the polymerized acid and the polymer sample is then filtered through a 100 mesh screen to remove coagulum.

Preparation Example D

Architectural Coating Binder with a $T_g$ of 25° C.

The following mixtures were prepared:

| Mixture | Component | Parts by Weight |
|---|---|---|
| A | 28% aqueous sodium laurylsulfate | 14.4 |
| B | Water | 20 |
|   | Sodium carbonate | 4.1 |
| C | Water | 12.0 |
|   | Ammonium persulfate | 4.4 |
| D | Water | 505.8 |
|   | 28% aqueous sodium laurylsulfate | 9.5 |
|   | MMA | 775.4 |
|   | BA | 675.8 |
|   | Methacrylic acid | 14.7 |
| E | Water | 44.8 |
|   | Ammonium persulfate | 0.61 |
| F | Water | 14.0 |
|   | 0.15% ferrous sulfate heptahydrate | 8.0 |
|   | 0.1% Versene | 12.0 |
|   | Sodium formaldehyde sulfoxylate | 0.42 |
| G | Water | 20 |
|   | 70% t-Butyl hydroperoxide | 0.70 |
| H | Ammonium Hydroxide | 11.2 |

A reactor equipped with a stirrer and condenser was charged with 639 g of deionized water. The reactor was then blanketed with nitrogen, heated to 88° C. and charged with Mixture A. Mixture B and 2.5% of Mixture D were added to the reactor followed by Mixture C. Within 5 minutes the temperature increased to 95° C. Ten minutes later, the remainder of Mixture D and Mixture E were separately metered in to the reactor over 1 hour at 88° C. When the feeds were complete, the reactor mixture was cooled to 75° C. and Mixture F was added followed by Mixture G which was metered in over 30 minutes. The reactor mixture was cooled to 45° C., neutralized by dropwise addition of Mixture H and then cooled to room temperature. The resulting polymer was filtered through a 100 mesh screen to remove coagulum.

EXAMPLES 1-4

Microparticle Synthesis

In each of the following Examples, 1-4, a reactor equipped with a stirrer and condenser and blanketed with nitrogen was charged with Mixture A and heated to 92° C. Mixtures B and C were separately emulsified with a hand-held high shear mixer until a stable emulsion was obtained (0.8-3 minutes). Mixture B was then slowly fed into the reactor over one hour. With the reactor contents at 64° C., Mixture C was added as a shot to start the reaction which was complete about 1.5 hours later. Next, where applicable, mixtures D, E and F, were separately metered in to the reactor over a period of 90 minutes. The resulting mixture was cooled to room temperature and analyzed by examined by optical microscopy and a Coulter Counter. The resulting mixture was cooled to room temperature and analyzed by optical microscopy and a Coulter Counter.

Example 1

5 μm Crosslinked BA Particle

This example illustrates growing 5 μm average diameter particles from 0.5 μm average diameter emulsion seed particles.

The following mixtures were prepared and processed as stated above:

| Mixture | Component | Parts by Weight |
|---|---|---|
| A | Water | 1830 |
|   | 0.5 μm average size emulsion seed particles from Preparation Example A2 | 3.7 |
| B | Water | 248 |
|   | 23% aqueous sodium dodecylbenzenesulfonate | 9.0 |
|   | BA | 556 |
|   | ALMA | 23 |
| C | Water | 10 |
|   | 23% aqueous sodium dodecylbenzenesulfonate | 1.2 |
|   | t-Butyl Peroctoate | 4.05 |

The particles were unirormiy sized and nearly 5 μm in average diameter.

Example 2

6 μm Average Size Core-shell Particle Duller

This example illustrates a one-pot process for polymerizing an outer shell of methyl methacrylate and ethyl acrylate onto the core polymer of Example 1.

The following mixtures were prepared and processed as stated above:

| Mixture | Component | Parts by Weight |
|---|---|---|
| A | Water | 1830 |
|   | 0.5 μm average size emulsion seed particles from Preparation Example A2 | 3.7 |

| Mixture | Component | Parts by Weight |
|---|---|---|
| B | Water | 248 |
| | 23% aqueous sodium dodecylbenzenesulfonate | 9.0 |
| | BA | 556 |
| | ALMA | 23 |
| C | Water | 10 |
| | 23% aqueous sodium dodecylbenzenesulfonate | 1.2 |
| | t-Butyl Peroctoate | 4.05 |
| D | Water | 50 |
| | 23% aqueous sodium dodecylbenzenesulfonate | 1.8 |
| | MMA | 139 |
| | EA | 5.8 |
| E | Water | 5.8 |
| | Sodium formaldehyde sulfoxylate | 0.44 |
| F | Water | 5.8 |
| | t-Butyl hydroperoxide | 0.65 |

The resulting particles were uniformly sized and about 6 µm in average diameter.

Example 3

2 µm Core-Shell Particle Duller from 0.3 µm Particle

This example illustrates growing 2 µm average diameter particles from the 0.3 µm average diameter emulsion particles of Preparation Example B. The following mixtures were prepared and processed as stated above:

| Mixture | Component | Parts by Weight |
|---|---|---|
| A | Water | 1490 |
| | The polymer emulsion of Preparation Example B | 2.75 |
| B | Water | 202 |
| | 23% aqueous sodium dodecylbenzenesulfonate | 7.3 |
| | BA | 452 |
| | ALMA | 18.8 |
| C | Water | 8.3 |
| | 23% aqueous sodium dodecylbenzenesulfonate | 0.94 |
| | t-Butyl Peroctoate | 3.3 |
| D | Water | 41 |
| | 23% aqueous sodium dodecylbenzenesulfonate | 1.5 |
| | MMA | 113 |
| | EA | 4.7 |
| E | Water | 4.7 |
| | Sodium formaldehyde sulfoxylate | 0.36 |
| F | Water | 4.7 |
| | t-Butyl hydroperoxide | 0.5 |

The resulting polymeric particles were uniformly sized and had an average diameter about 2 µm.

Example 4

4 µm Core-shell Particle Duller from 0.5 µm Particle

This example illustrates growing 4 µm average diameter particles from 0.5 µm average diameter emulsion particles. The following mixtures were prepared:

| Mixture | Component | Parts by Weight |
|---|---|---|
| A | Water | 1490 |
| | Emulsion Polymer of Preparation Example A2 | 10.7 |

| Mixture | Component | Parts by Weight |
|---|---|---|
| B | Water | 202 |
| | 23% aqueous sodium dodecylbenzenesulfonate | 7.3 |
| | BA | 452 |
| | ALMA | 18.8 |
| C | Water | 8.3 |
| | 23% aqueous sodium dodecylbenzenesulfonate | 0.94 |
| | t-Butyl Peroctoate | 3.3 |
| D | Water | 41 |
| | 23% aqueous sodium dodecylbenzenesulfonate | 1.5 |
| | MMA | 113 |
| | EA | 4.7 |
| E | Water | 4.7 |
| | Sodium formaldehyde sulfoxylate | 0.36 |
| F | Water | 4.7 |
| | t-Butyl hydroperoxide | 0.5 |

The resulting particles were uniformly sized and about 4 µm in average diameter.

EXAMPLES 5-12

Binder Neutralization

Example 5

Neutralized Two-Stage Binder

The two-stage, toughened elastomeric binder process from Preparation Example C was neutralized to pH 7.5 with aqueous ammonium hydroxide.

Example 6

Neutralized Two-Stage Binder

The two-stage, toughened elastomeric binder process from Preparation Example C was repeated using 675.5 g BA and 24.5 grams AA as the monomer mixture in Mixture A and 300 grams of MMA in Mixture G. The resulting two-stage binder was neutralized to pH 7.5 with triethylamine.

Example 7

Neutralized Two-Stage Binder

The two-stage, toughened elastomeric binder process from Preparation Example C was repeated using 612 g BA, 160 grams of EA and 28 grams of AA as the monomer mixture in Mixture A and 200 grams of MMA in Mixture G. The resulting two-stage binder was neutralized to pH 7.5 with aqueous ammonium hydroxide.

Example 8

Neutralized Two-Stage Binder

The two-stage, toughened elastomeric binder process from Preparation Example C was repeated using 292 g BA, 480 grams of EA and 28 grams of AA as the monomer mixture of Mixture A and 200 grams of MMA in Mixture G. The resulting two-stage binder was neutralized with 2.0 grams of ZnO slurried in 20 grams water and brought to pH 7.5 with aqueous ammonium hydroxide.

Example 9

Neutralized Two-Stage Binder

The two-stage, toughened elastomeric binder process from Preparation Example D was repeated using 772 grams of EA, and 28 grams of AA as the monomer mixture in Mixture A and 200 grams of MMA in Mixture G. The resulting two-stage binder was neutralized to pH 7.5 with aqueous ammonium hydroxide.

Example 10

Neutralized Two-Stage Binder

Example 9 was repeated except 133 grams of Tergitol 15-S-15 (a long chain alcohol ethoxylate surfactant) was used to replace the sodium dodecylbenzenesulfonate in Mixture A. The resulting two-stage binder was neutralized to pH 7.5 with triethylamine.

Example 11

Neutralized Two-Stage Binder

Example 9 was repeated except 49 grams of Aerosol A-102 (a disodium ethoxylated sulfosuccinate surfactant) was used to replace the sodium lauryl sulfate/sodium dodecylbenzenesulfonate surfactant mixture. The resulting two-stage binder was neutralized to pH 7.5 with aqueous ammonia.

Example 12

Neutralized Two-Stage Binder

Example 9 was repeated except 49 grams of Aerosol A-102 (a disodium ethoxylated sulfosuccinate surfactant) was used to replace the sodium lauryl sulfate/sodium dodecylbenzenesulfonate surfactant mixture and all of the EA was replaced with EHA. The resulting two-stage binder was neutralized to pH 7.5 with aqueous ammonia.

EXAMPLES 13-15

Application to Leather

Leather preparation: Corrected grain leather (commercial grade) was finished by spray applying (using air pressured spray gun HPLV) to a coating weight of 0.03-0.045 dry $Kg/m^2$ (3-4 dry grams/$ft^2$) of an acrylic emulsion copolymer basecoat. The basecoat was dried and subjected to smoothing by use of a finiflex at 90° C. to smooth the basecoat surface. After smoothing the basecoat, a pigment free topcoat of each Example 13-15 was applied to the basecoat to a coating weight of 0.0048-0.0065 $Kg/m^2$. The finished leather was dried in a 90° C. oven for 2 minutes and further dried overnight at ambient conditions.

Examples 13A and 13B

Single and Two-Stage Duller Particles in Topcoats

This example illustrates the performance of core-shell and of single stage duller particles in topcoat formulations. The Example 13B duller comprises 3.74 g of a 1μm BA-STY emulsion copolymer seed particle swollen with 278 g of a monomer mixture composed of 272 g t-BA, 3 g DVB, and 3 g diethyleneglycol dimethacrylate to grow the 7 μm average diameter poly(t-BA) bead. The following formulations were made by simple mixing with lab bench mixer in a suitable plastic paint container.

| | EXAMPLE | |
|---|---|---|
| | 13A | 13B |
| Description of Formulation | | |
| Dulling bead | Of Example 2 | t-BA/DVB/DEGDMA |
| Nominal Average Diameter (determined by Coulter Counter) | 5u | 7u |
| Dulling bead solid % | 31.3 | 16 |
| Beads/Binder solid ratio in topcoat | 50/50 | 60/40 |
| Formulation | grams | grams |
| Water | 492 | 254 |
| Dulling Bead | 202.9 | 476.25 |
| Binder of Example 10 (36 wt. % solids) | 176.1 | 140.9 |
| [1]Polyether modified polysiloxane flow aid (100 wt. % olids) | 8 | 8 |
| Additive 2229W (60 wt. % solids) | 10 | 10 |
| [2]Hydrophobically Modified Ethoxylate Urethane (HEUR) Rheology Modifier (25 wt. % solids) | 31.2 | 31.2 |
| [3]Aliphatic Polyisocyanate (50 wt. % solids) | 80 | 80 |
| Total weight | 1000 | 1000 |
| Total solids | 188.8 | 188.8 |
| Topcoat Solids (wt. %) | 18.9 | 18.9 |
| Component ratios | | |
| % Dulling beads solid/total weight | 6.35 | 7.62 |
| % binder solids/total weight | 6.35 | 5.08 |

|  | EXAMPLE | |
|---|---|---|
|  | 13A | 13B |
| % (bead + binder) solid/total weight | 12.70 | 12.70 |
| Viscosity by Zahn cup #2 | 35-40 s | 35-40 s |
| Dry add-on (kg/m2) | 0.0048-0.0065 | 0.0048-0.0065 |

[1]Aquaderm ™ Fluid H (Lanxess GmbH, Leverkusen, DE);
[2]Acrysol ™ RM-825 (Rohm and Haas Co., Phila., PA);
[3]Aquaderm ™ XL-50 (Lanxess GmbH)

The performance of the topcoats in Examples 13A and 13B was as follows:

| Performance Test | Example 13A | Example 13B |
|---|---|---|
| Gloss | | |
| 60° | 0.9 | 0.9 |
| 85° | 1.7 | 3.8 |
| Gloss after burnishing testing | | |
| 60° | 1.4 | 4.9 |
| 85° | 4.1 | 13.2 |
| Wet Rub Resistance | 4 | 4.5 |
| Flexibility | | |
| Topcoat cracking | none | none |
| Topcoat White crazing | none | none |
| Color | | |
| L* | 22.61 | 22.27 |
| a* | −0.12 | −0.13 |
| b* | −0.53 | −0.57 |
| c* | 0.54 | 0.59 |

As Examples 13A and 13B show, both multi-stage and single stage acrylic dullers may be used to provide soft, burnish resistant, flexible and color stable leather coatings.

Example 14

Topcoat Applications Core Shell Dullers in Various Proportions

This example illustrates the performance of formulations comprising a core shell dulling particles in various proportions. The following formulations were made by simple mixing with a lab bench top mixer in a plastic paint container and were tested, as shown in the following table.

The performance of the topcoats of Examples 14A and 14B indicates that the duller particles provide good film properties at 80/20 or more w/w duller to binder.

|  | EXAMPLE | | |
|---|---|---|---|
|  | 13A | 14A | 14B |
| Duller beads used | Example 2 | Example 2 | Example 2 |
| Nominal Average Diameter (as determined by Coulter Counter) | 5u | 5u | 5u |
| Duller bead solid wt. % | 31.3 | 31.3 | 21 |
| Beads/Binder solid wt. ratio in topcoat | 50/50 | 90/10 | 80/20 |
| Ingredient | grams | grams | grams |
| Water | 492 | 484 | 317 |
| Duller Bead | 202.9 | 351.0 | 483.8 |
| Binder of example 10 (36 wt. % solids) | 176.1 | 35.2 | 70.4 |
| [1]Polyether modified polysiloxane flow aid (100 wt. % solids) | 8 | 8 | 8 |
| Additive 2229W (60 wt. % solids) | 10 | 10 | 10 |
| [2]Hydrophobically Modified Ethoxylate Urethane (HEUR) Rheology Modifier (25 wt. % solids) | 31.2 | 32 | 31.2 |
| [3]Aliphatic Polyisocyanate (50 wt. % solids) | 80 | 80 | 80 |
| Total weight | 1000 | 1000 | 1000 |
| Total solids wt. | 188.8 | 184.6 | 188.8 |
| Topcoat Solid % | 18.9 | 18.5 | 18.9 |
| Component ratios | | | |
| % Dulling beads solid/total weight | 6.35 | 11.0 | 10.16 |
| % binder solid/total weight | 6.35 | 1.27 | 2.54 |
| % (bead + binder) solid/total weight | 12.70 | 12.25 | 12.70 |

-continued

| | EXAMPLE | | |
|---|---|---|---|
| | 13A | 14A | 14B |
| Viscosity by Zahn cup #2 | 35-40 s | 35-42 s | 35-40 s |
| Dry add-on (Kg/m$^2$) | 0.0048-0.0065 | 0.0048-0.0065 | 0.0048-0.0065 |
| Performance Test | | | |
| Gloss | | | |
| 60° | 0.9 | 0.3 | 0.4 |
| 85° | 1.7 | 1 | 1.4 |
| Gloss after burnishing testing | | | |
| 60° | 1.4 | not tested | 1.2 |
| 85° | 4.1 | not tested | 5.1 |
| Wet Rub Resistance | 4 | 4.5 | 4 |
| Flexibility | | | |
| Topcoat cracking | none | slight | none |
| Topcoat white crazing | none | none | none |
| Color | | | |
| L* | 22.61 | 19.62 | 19.76 |
| a* | −0.12 | −0.12 | −0.14 |
| b* | −0.53 | −0.43 | −0.55 |

$^1$Aquaderm ™ Fluid H (Lanxess GmbH, Leverkusen, DE);
$^2$Acrysol ™ RM-825 (Rohm and Haas Co., Phila., PA);
$^3$Aquaderm ™ XL-50 (Lanxess GmbH)

Example 15

Performance of Single Stage Dulling Particles

This example illustrates the performance of single stage dulling particles in topcoats. The following formulations were made by simple mixing using a lab bench mixer in a plastic paint container and tested, as follows:

| | Example 15 |
|---|---|
| Duller bead used | Example 1 |
| Nominal Average Diameter (as determined by Coulter Counter) | 5u |
| duller bead solid % | 20.2 |
| Beads/Binder solid weight ratio in topcoat | 50/50 |
| Ingredient | grams |
| Water | 380 |
| Duller Bead | 314.4 |
| Binder of Example 10 (36 wt. % solid) | 176.1 |
| $^1$Polyether modified polysiloxane flow aid (100 wt. % solids) | 8 |
| Additive 2229W (60 wt. % solids) | 10 |
| $^2$Hydrophobically Modified Ethoxylate Urethane (HEUR) Rheology Modifier (25 wt. % solids) | 31.2 |
| $^3$Aliphatic Polyisocyanate (50 wt. % solids) | 80 |
| Total | 1000 |
| Total solids | 188.8 |
| Solid % | 18.9 |
| % bead solids/total weight | 6.35 |
| % binder solids/total weight | 6.35 |
| % (bead + binder) solids/total weight | 12.70 |
| Viscosity by Zahn #2 | 35-40 s |
| Dry add-on (kg/m2) | 0.0048-0.0065 |
| Performance Test | |
| Gloss | |
| 60° | 1.9 |
| 85° | 1.6 |

-continued

| | Example 15 |
|---|---|
| Gloss after burnishing testing | |
| 60° | 3 |
| 85° | 9.3 |
| Wet Rub Resistance | 4 |
| Flexibility | |
| Topcoat cracking | none |
| Topcoat white Crazing | slight |
| Color | |
| L* | 23.11 |
| a* | −0.12 |
| b* | −0.51 |

$^1$Aquaderm ™ Fluid H (Lanxess GmbH, Leverkusen, DE);
$^2$Acrysol ™ RM-825 (Rohm and Haas Co., Phila., PA);
$^3$Aquaderm ™ XL-50 (Lanxess GmbH)

We claim:

1. An aqueous composition comprising:
   polymeric duller component A) composed of particles chosen from a multi-stage graded refractive index (grin) composition copolymer having an average diameter of 1-20 μm, a multi-stage copolymer having an average diameter of 1-20 μm and a rubbery core having a glass transition temperature ($T_g$) of 20° C. or less, and mixtures thereof; and,
   binder component B) composed of one or more film forming organic binder compatible with the duller component A).

2. A composition as claimed in claim 1, wherein each of the duller component A) and the binder component B) is acrylic.

3. A composition as claimed in claim 1, wherein the said duller component A) is chosen from acrylic multi-stage copolymer, vinyl multi-stage copolymer, multi-stage synthetic rubber copolymer, multi-stage urethane copolymer, water-dispersible graft copolymer, mixtures thereof, combinations thereof, and mixtures thereof with a single stage crosslinked (co)polymer.

4. A composition as claimed in claim 1, wherein the weight ratio, as solids, of the said duller component A) to the said binder component B) ranges from 0.1:1 to 10:1.

5. A composition as claimed in claim 2, wherein the said binder component B) comprises a two-stage acrylic emulsion copolymer.

6. A method of making a coating comprising:
forming an aqueous composition comprising duller component A) comprising particles chosen from a multi-stage graded refractive index (grin) composition copolymer having an average diameter of 1-20 μm, a multi-stage copolymer having an average diameter of 1-20 μm and a rubbery core having a glass transition temperature ($T_g$) of 20° C. or less; and,
binder component B) comprising one or more film forming organic binder compatible with the duller component A),
applying the coating composition to one or more substrate; and,
drying the coating composition.

7. A composition as claimed in claim 1, further comprising an additional duller chosen from inorganic dullers and organic dullers.

8. An aqueous composition as claimed in claim 1, wherein the polymeric duller component A) is the multi-stage copolymer comprising a graded refractive index (grin) composition.

9. The aqueous composition as claimed in claim 1, wherein the said duller component A) is composed of particles having an average diameter of 2 μm or more.

10. The method as claimed in claim 6, wherein the said duller component A) is composed of particles having an average diameter of 2 μm or more.

* * * * *